Feb. 6, 1945.  E. S. PEARCE  2,368,677
JOURNAL BEARING
Filed June 2, 1942
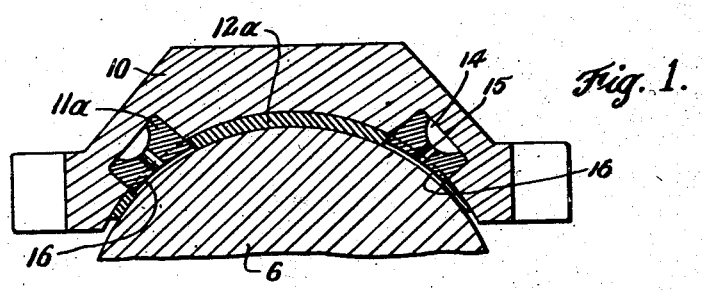
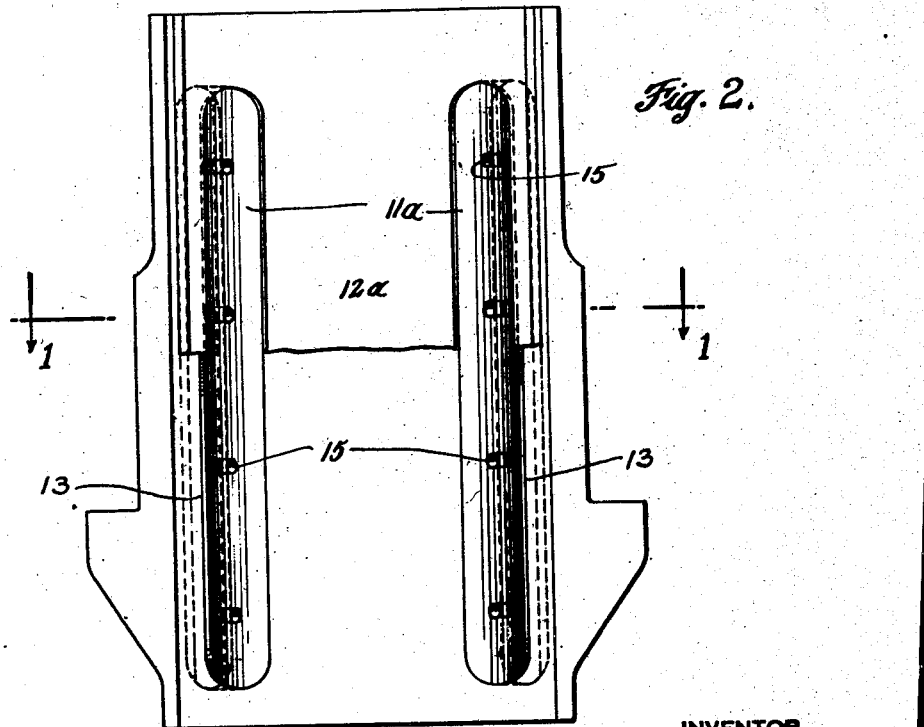
INVENTOR
Edwin S. Pearce
BY
ATTORNEYS Patented Feb. 6, 1945

2,368,677

UNITED STATES PATENT OFFICE 2,368,677

JOURNAL BEARING

Edwin S. Pearce, Indianapolis, Ind.

Application June 2, 1942, Serial No. 445,419

2 Claims. (Cl. 308—79.1)

This invention relates to journal bearings and particularly to crown journal bearings for use in the axle boxes of railway vehicles.

The objects of the invention include the following: To provide a structure by means of which it is possible to greatly reduce the quantities of strategic metals such as copper, lead, tin and antimony which have heretofore gone into the manufacture of bearings of the type in question; to improve the strength of the bearing as well as its resistance to the destructive effects of heat; to provide a structure which combines the best characteristics of ferrous as well as of non-ferrous metals; to provide a bearing which has an increased margin of operating safety; to provide a bearing which may be relatively cheaply manufactured, easily replaced or renewed as well as one which is interchangeable with prevailing structures; to provide a bearing having a backing member of relatively hard metal such as steel and a Babbitt metal lining therefor, together with a supplemental bearing surface of relatively soft metal at each side of the crest, which supplemental surfaces are normally out of contact with the journal but are adapted to make contact therewith to support the load in event of failure of the Babbitt metal lining so as to avoid damage to the journal which might be caused by contact between the steel or hard metal backing member and the surface of the journal; to provide oil storage means in the journal at each side of the crest which are filled with lubricant by oil which is carried upwardly on the surface of the journal from the oil soaked waste customarily used in the bottom of the journal box; and, in general, to materially improve the operational characteristics of railway axle crown journal bearings while at the same time cheapening their cost, increasing their strength, simplifying their maintenance and reducing the quantities of strategic bearing metals normally employed in their manufacture.

Other objects and advantages will occur to those skilled in this art as the description proceeds, reference now being had to the accompanying drawing, wherein—

Figure 1 is a vertical transverse section through a journal bearing embodying my improvements taken as indicated by the line 1—1 in Figure 2; and Figure 2 is a face view of the underside of my improved bearing.

By referring to the drawing, it will be seen that in Figure 1 I have illustrated the upper portion of the usual journal 6 on the end of a car axle, which journal projects into the journal box in a manner well understood in this art.

The bearing comprises a structural backing or strength member 10, preferably of steel, a pair of relatively soft bearing metal inserts 11a preferably of bronze, and a Babbitt metal lining 12a. The inserts are elongated members which fit snugly into correspondingly elongated slots 13 in the journal face of the backing member 10. The slots and the inserts are of substantial dimension circumferentially of the journal, and they extend, preferably, throughout substantially the entire length of the bearing, as indicated in Figure 2. It will also be noted that there is a slot 13 with its insert 11 at each side of the bearing, and that they are located well beyond the crest or region of high bearing pressure. In this way they are not subject to the stresses set up near the crest of the bearing.

The inserts project slightly beyond the journal face of the backing member, as clearly shown in Figure 1, and the Babbitt metal lining 12 is applied over the journal face of the backing member only so that the Babbitt metal under normal conditions projects beyond the journal faces of the inserts. In this way the supplemental bearing surfaces provided by the inserts are normally held out of contact with the journal. However, in the event of failure of the Babbitt metal lining the inserts 11a will come into contact with the journal 6 and prevent contact between the backing member 10 and the journal so as to avoid damage to the latter. Failure of the Babbitt lining may come about either by normal wear or as the result of high temperature due to a hot box, which of course will melt the lining as is well understood in the art.

The inserts 11a are shown as being formed with longitudinal channels or grooves in their upper faces which form oil storage wells or pockets 14 which extend longitudinally of the bearing and are substantially coextensive with the length of the insert and its slot. Extending downwardly from the base of the slots 14 toward the surface of the journal are a plurality of oil connecting apertures or passages 15 which open into a space 16 formed between each insert 11a and the surface of the journal 6. The spaces 16 are created by virtue of the fact that the Babbitt metal lining 12a does not extend over the journal face of the inserts 11a.

When the journal is rotating, oil is carried on the upbound side thereof to the space 16 from whence it passes through the openings 15 into the channel or well 14 where it is held in a reservoir, as it were. A supply of oil is thus always available the moment that the journal begins to turn so that initial adequate lubrication for the journal is never dependent upon bringing up the oil from the waste in the bottom of the box. As is well known in this art, especially in cold weather, there is sometimes a lag in the effective lubrication of the bearing which may result in a hot box, and this is avoided by the improvement just described.

It will be seen that my invention makes it possible to substantially reduce the amount of bearing metal or bearing metal alloy which has heretofore been employed in the manufacture of crown journal bearings. As a general rule, in previous practice the entire bearing has been made of a solid piece of bronze with a lining of Babbitt metal, but with my invention the backing member can be made of steel which is not only less expensive but also far stronger than brass and much less subject to damage from overheating. In this connection it should also be realized that my improvements make it possible to provide a bearing construction of greatly increased strength while, at the same time, in no way sacrificing the advantages which are to be found in the employment of the so-called bearing metals.

What I claim is:

1. A crown journal bearing having a backing member of relatively hard metal, a longitudinal slot in the journal face at each side of the crest of said backing member, a bearing metal insert fitting each slot and projecting therefrom somewhat beyond the journal face, a Babbitt metal lining on the journal face of the backing member which lining projects beyond the plane of the journal faces of said inserts, an oil storage well in an insert, and an oil passage extending from said well to the journal face of the insert.

2. A crown journal bearing having a backing member of relatively hard metal, a longitudinal slot in the journal face at each side of the crest of said backing member, a bearing metal insert fitting each slot and projecting therefrom somewhat beyond the journal face, a Babbitt metal lining covering the journal face of the backing member, said lining projecting beyond the plane of the journal faces of said inserts, an oil storage well in the upper face of each insert, and an oil passage in each insert extending from said well to the journal face of the insert.

EDWIN S. PEARCE.